Figure 1:
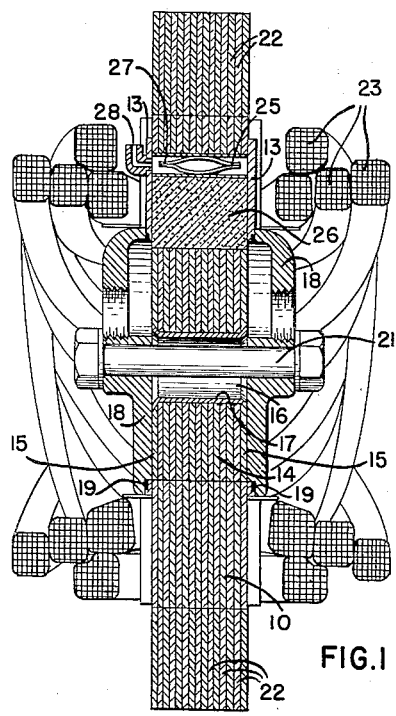

Dec. 25, 1951  H. C. ROTERS  2,579,865
INDUCTION MOTOR

Filed Nov. 9, 1948  2 SHEETS—SHEET 1

*INVENTOR.*
HERBERT C. ROTERS
BY Laurence B Dodds
ATTORNEY

Dec. 25, 1951  H. C. ROTERS  2,579,865
INDUCTION MOTOR

Filed Nov. 9, 1948

2 SHEETS—SHEET 2

INVENTOR.
HERBERT C. ROTERS
BY Laurence B. Dodds
ATTORNEY

Patented Dec. 25, 1951

2,579,865

UNITED STATES PATENT OFFICE 2,579,865

INDUCTION MOTOR

Herbert C. Roters, Kew Gardens, N. Y., assignor to De Laval Separator Company, a corporation of New Jersey Application November 9, 1948, Serial No. 59,113

10 Claims. (Cl. 172—120)

This invention relates to induction motors and, while it is of general application, it is particularly adapted for embodiment in an electromagnetic fluid pump of the rotary type and will be specifically described in that connection. Also, it is particularly adapted for embodiment in any apparatus involving a gyratory or epicycloidal movement, such as in vibrators, mixers, grinders, etc.

In the copending application of George C. Stoddard, Serial No. 606,977, filed July 25, 1945, now Patent No. 2,561,890, and entitled "Dynamoelectric Machine," there is disclosed and claimed a combined electric motor and pump comprising essentially relatively movable field and magnetic armature members, one of the members defining a chamber and the other being of convex configuration and of lesser cross-sectional area than the chamber and disposed for relative gyratory motion within said chamber. The field member includes means for producing a rotating magnetic field to effect relative gyratory motion between the members. The means for developing the rotating magnetic field specifically disclosed in aforesaid copending application comprises a series of actuating magnets arranged peripherally around the pump chamber and excited sequentially in groups by means of a distributor driven in synchronism with the rotor.

The present invention comprises in one aspect an improvement on the dynamoelectric machine of the aforesaid copending application in providing a winding arrangement effective to develop the desired rotating magnetic field from a commercial polyphase alternating-current supply circuit. The dynamoelectric machine of the present invention involves what is believed to be a fundamentally new principle of motor operation. Basically, the preferred form of the dynamoelectric machine of the invention operates on induction motor principles although utilizing winding means disposed wholly on the field member, the distributed polyphase winding or squirrel-cage winding heretofore required on the armature of such induction motors being eliminated. The path for the induction motor currents is provided by additional windings on the stator or, with certain preferred winding arrangements, by the primary exciting windings themselves. An analysis of the basic new principles involved is included hereinafter.

It is an object of the present invention, therefore, to provide a new and improved induction motor of the type described capable of operation from a commercial polyphase alternating-current supply circuit.

It is another object of the invention to provide a new and improved induction motor in which the necessity for any form of winding means on the armature member is eliminated.

It is a further object of the invention to provide a new and improved induction motor of the type described, in which the only moving element is a magnetic armature member, preferably in the form of a simple cylinder.

In accordance with the invention, an induction motor comprises relatively movable field and magnetic armature members, such members being one within the other and having relative configurations providing an asymmetrical reluctance relative to the axis of the field member. The field member includes a symmetrical distributed polyphase winding system including a plurality of phase windings connected to provide a path of low impedance to induced currents of a predetermined slip frequency and normal impedance to currents of supply frequency for producing between the two members relative movement having a rotational component.

For a better understanding of the present invention, together with other and further objects thereof, reference is had to the following description taken in connection with the accompanying drawings, and its scope will be pointed out in the appended claims.

Figure 3:
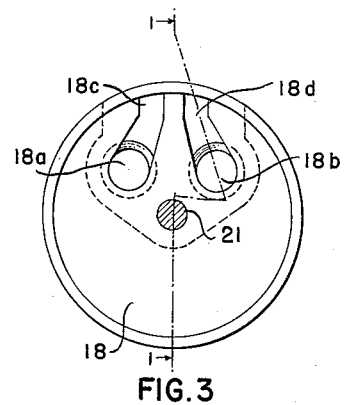
Figure 4:
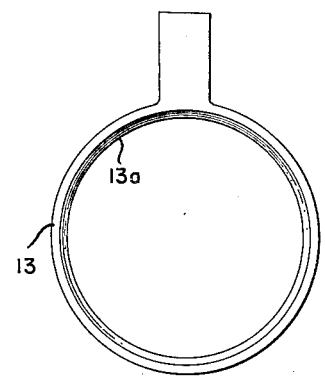
Figure 2:
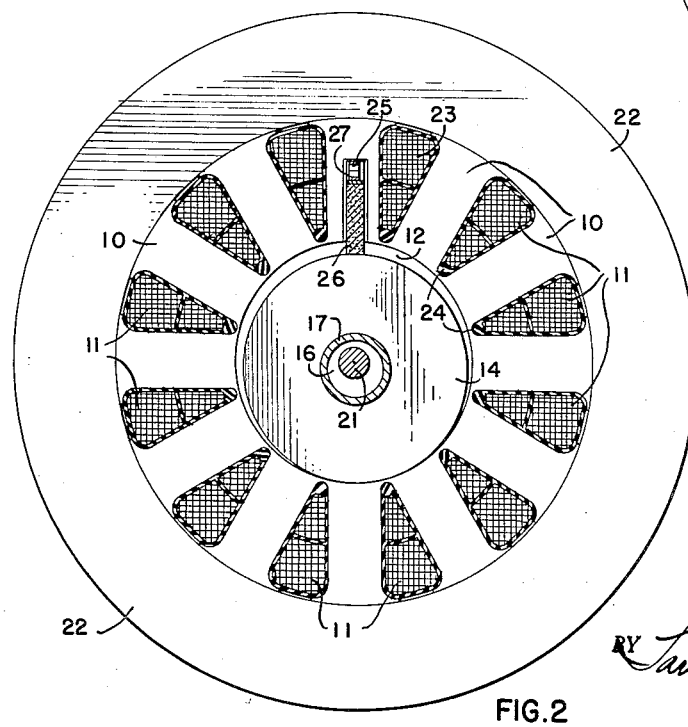
Figure 5:
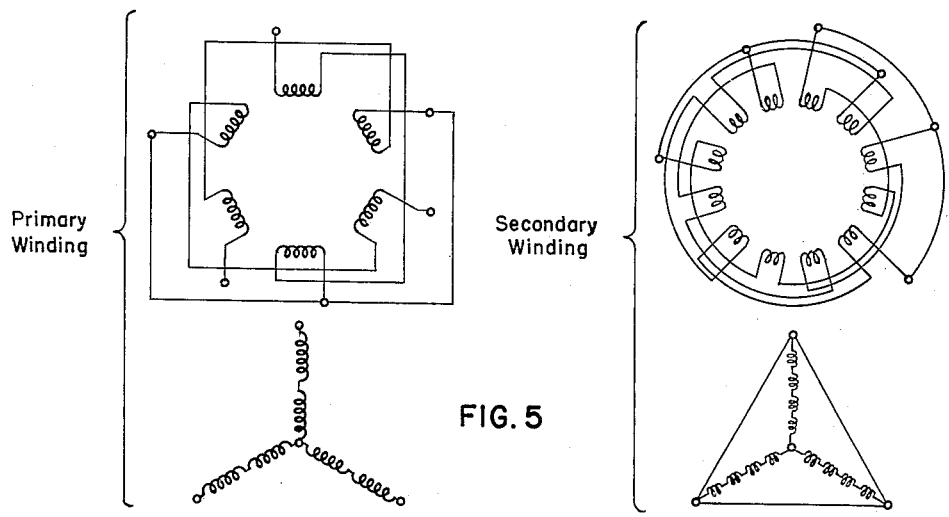
Figure 6:
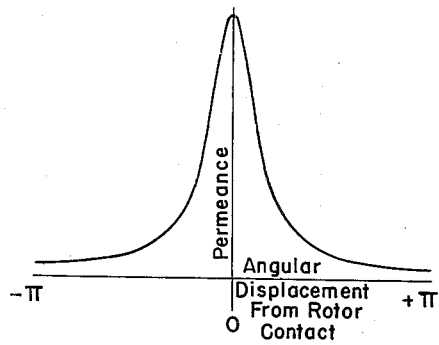
Figure 7:
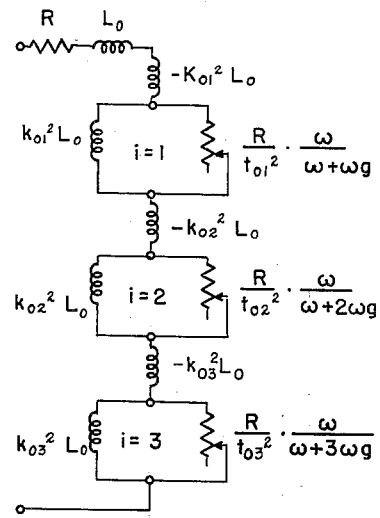
Figures 8A, 8B, 8C:
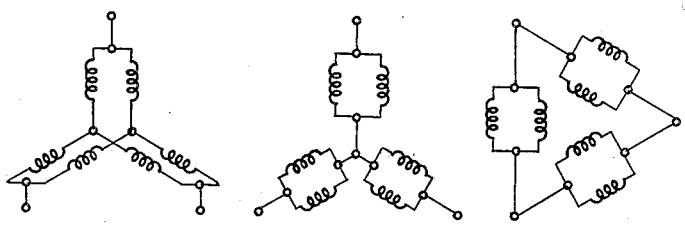

Referring to the drawings, Fig. 1 is a longitudinal sectional view of a dynamoelectric machine embodying the invention; Fig. 2 is a cross-sectional view of the machine of Fig. 1; Fig. 3 is an end view of an end cap; Fig. 4 is a detailed view of the end plates of Fig. 1; Fig. 5 is a circuit diagram of a two-winding species of the dynamoelectric machine of the invention; Fig. 6 is a graph of the permeance characteristic of the machine of Fig. 1; Fig. 7 is a circuit diagram of an equivalent electrical circuit to assist in the explanation of the invention; Figs. 8a, 8b, and 8c are circuit diagrams of various winding connections of a single circuit dynamoelectric machine embodying the invention.

Referring now to Figs. 1 and 2 of the drawings, there is illustrated an induction motor embodying the present invention and comprising relatively movable field and magnetic armature members, such members being one within the other and having relative configurations providing an asymmetrical reluctance relative to the axis of the field member. Specifically, the field member is stationary and comprises a stack of spider laminations 10 forming a series of peripheral external radial winding slots 11 and a continuous cylindrical rotor tunnel or chamber 12. The laminations may be secured in stacked and insulated relation by any known means, as by gluing them together with thermosetting or thermo-plastic resinous adhesive, as described in United States Patent No. 2,423,345. In order to provide flat and true surfaces on the two ends of the stator stack, stator end plates 13, 13 are provided. A plan view of one of the end plates 13 is shown in Fig. 4. As there indicated, each end plate has on one face thereof, and at its inner diameter, an annular recess 13a for receiving an annular gasket 19.

Surrounding the field stack 10 is a magnetic yoke member 22 which may comprise a stack of annular laminations secured by a resinous adhesive or otherwise. The outer surface of the field stack 10 and the inner surface of the yoke stack 22 may be turned or ground to provide a close fit having a low magnetic reluctance.

The induction motor of the invention also comprises a convex magnetic armature member of lesser cross-sectional area than the rotor chamber 12. For example, the magnetic armature may be in the form of a laminated cylindrical member 14 of a lesser diameter than the rotor chamber 12. The rotor member 14 is disposed within the chamber 12 and, except for axial constraint described hereinafter, is full-floating, so that it may execute a gyratory motion with respect to, and within, the chamber 12. The rotor stack 14 is faced with relatively heavy end plates 15, 15. The rotor laminations and the end plates 15, 15 also may be secured together in insulated relation by any known means, as by a resinous adhesive in the same manner as the stator described above. The rotor 14 is provided with a central bore 16 in which is inserted a tube 17 which is spun or otherwise deformed at the ends thereof more firmly to secure the laminations and end plates together, as shown in Fig. 1. After assembly, as described, the rotor end plates 15, 15 may be ground or turned to provide true and parallel faces.

The rotor 14 is retained within the armature tunnel 12 by means of a pair of similar end caps 18, 18, one of which is shown in detailed plan view in Fig. 3. The end caps 18, 18 are disposed to engage the gaskets 19, 19 located in the recesses 13a, 13a of the end plates 13, 13. In order to retain the several parts in the position described, there is provided a through bolt 21 extending between the end caps 18, 18 and through the bore 16 of the armature member 14. The bore 16 is made somewhat larger than the bolt 21 so that, while the armature is constrained axially by the end caps 18, 18, it is permitted full-floating movement in all directions normal to its axis.

The induction motor of the invention also comprises symmetrical polyphase winding means disposed in the winding slots 11 for producing between the field member 10 and the rotor member 14 relative movement having a rotational component, specifically, a gyratory motion of the rotor 14 in the chamber 12. The field windings 23 include a plurality of phase windings connected to provide a path of low impedance or a short circuit to induced currents of a predetermined slip frequency. In a preferred form of the invention, the exciting winding itself is connected to provide such a path for the induced currents of slip frequency. Such a winding system is represented schematically by the circuit diagrams of Figs. 8a, 8b, and 8c, described hereinafter. It will be understood that the windings of each phase group may be arranged in any conventional manner. Preferably, the bottom portion of each of the winding slots 11 is filled with a suitable sealing member, such as a comminuted cork seal 24 cemented in place by a resinous adhesive. Each of the winding slots may be lined with conventional paper liner (not shown).

The induction motor thus far described is one of general application which may be utilized to develop mechanical power, or in which the rotor member 14 may be the power consuming element itself. For example, it may comprise the rotor of a vibrator, mixer, grinder, etc., or, as illustrated, a rotary vane-type pump. To this end, a radial vane slot 25 is formed in one of the teeth of the field member 10 and there is disposed in this slot a suitable vane, such as a carbon vane 26, biased into engagement with the rotor 14 by a double-leaf spring 27 or equivalent. It may be desirable in a construction of the type described to provide the slot 25 with a suitable liner (not shown).

When the induction motor of the invention is a pump, as described, the rotor 14 is finished accurately to the same axial dimension as the stator 10 or with a slight tolerance to provide a sliding fit within the end caps 18, 18. Furthermore, each end cap is provided with inlet and outlet ports 18a and 18b, respectively, disposed on opposite sides of the vane 26 and ducts 18c and 18d connecting respectively with the ports 18a and 18b and the upper portions of the pump chamber 12 on opposite sides of the vane 26. A drain vent 28 connects with the upper end of the vane slot 25 to permit the discharge of any fluid seepage past the vane 26.

It is believed that the general physical construction and assembly of the induction motor of the invention will be clear to those skilled in the art from the foregoing description. Furthermore, the operation of the machine as a rotary vane-type pump is quite conventional and in accordance with the pump illustrated and claimed in aforesaid copending application of George C. Stoddard, so that a detailed description thereof appears unnecessary. However, the electrical principles involved in driving the unwound rotor member 14 from the polyphase distributed windings 23 are believed to be basically new. Therefore, a complete electrical analysis of the machine appears in order.

Consider, first, an induction motor embodying the invention of the three-phase two-pole type ($p$, the number of pole pairs equal to 1) having separate primary and secondary windings disposed in the same slots and arranged and connected as shown in Fig. 5. The primary winding comprises six phase groups, the groups of each phase being connected in series and the several phases being Y-connected. The secondary winding comprises twelve phase groups, the windings of each phase being connected in series and the several phases being Y-connected and having a delta-connected short circuit. However, the secondary winding has the four groups of each phase arranged as a four-pole winding ($p=2$). With this arrangement, for any even number of pole pairs ($p=2, 4, 6$, etc.) in the flux distribution linking the primary winding and the rotor, corresponding to even harmonics in the space distribution of such flux, the secondary winding provides a short-circuit path of very low impedance for voltages of such harmonic frequencies induced therein, but without at the same time constituting a short circuit for induced voltages of the fundamental frequency.

The winding arrangement and connection of Fig. 5 is a general one, in which the primary and secondary windings are independent and in which there is a wide range of choices in the arrangement and connection of the secondary phase groups to provide short-circuit paths for various even harmonics in the space distribution of the flux ($p=1, 2, 3$, etc.). The winding arrangements and connections of Figs. 8a, 8b, and 8c are special cases of the general winding arrangement of Fig. 5, in which the primary and secondary windings are merged and are such as to provide short-circuit paths for the desired harmonic components and simultaneously to present substantial impedances to the primary applied electromotive force. There are a limited number of such special winding arrangements in which a single winding system serves as both a primary and a secondary. Certain of these special winding arrangements and their essential criteria will be discussed hereinafter.

The analysis of the motor is complicated by by two factors: (1) the permeance around the air gap varies over a wide range and (2) due to the slip of the rotor, the rotating primary field encounters a continuously variable permeance and is effectively modulated thereby at the slip frequency.

A rigorous mathematical analysis of the motor, its controlling design parameters, and its performance characteristics has been made and certain of the important results of this analysis are given hereinafter to aid those skilled in the art in practising the invention.

In order to reduce the complexity of the analysis, the equations which follow have been developed for the special case of the single winding motor of Figs. 8a, 8b or 8c, but these equations are also applicable to the general case of the two-winding motor of Fig. 5, if it is assumed that there is unity coefficient of coupling between the primary and secondary windings, as by placing both windings in the same slots, and that both windings have the same number of turns. Modification of the equations to take care of a coefficient of coupling other than unity can be effected by recognized design principles and, in case the two windings have different numbers of turns, the term $N^2$ in the equations is replaced by the term $N_1 N_2$. As will be developed hereinafter, in the special case of the motor represented by Figs. 8a, 8b, and 8c, the single winding is analogous to a combination of both primary and secondary windings of a conventional induction motor. Further, the single winding carries current of several secondary frequencies. For ease of reference, the winding will be referred to as the primary winding system with respect to currents of the supply frequency and as a secondary winding system with respect to current of each secondary frequency.

In the analysis which follows, the following notations will be used:

$p$ = number of primary pole pairs;
$s$ = number of slots or coils;
$g$ = number of phase groups (so that $\frac{s}{g}$ = number of coils per group);
$N$ = number of turns per phase group (so that $\frac{Ng}{s}$ = number of turns per coil);
$y$ = coil pitch, in slots, the coil return being $y$ slots forward for positive $y$;

$K_n = \frac{1}{n} \sin \pi \frac{yn}{s} \cdot \frac{\sin \pi n/g}{(s/g) \sin \pi n/s}$, for any integer $n$ not a multiple of $s$, $= \pi \frac{y}{s}$ for $n=0$, $= 0$ for $n$ any integer multiple of $s$ except 0;

$\mu$ = absolute permeability of air;
$l$ = axial length of the air gap;
$r$ = radius of the stator bore;
$l_s$ = ½ the maximum air gap or difference between the radii of stator (inside) and rotor (outside);
$l'_s$ = added gap length equivalent to the reluctance of the iron magnetic circuit;
$\theta$ = angle in radians around stator surface, counterclockwise from initial slot;
$(p+i)$ = number of secondary pole pairs;
$\omega$ = angular frequency of supply current;
$\omega_t$ = gyratory angular velocity of rotor, positive counterclockwise;
$t$ = time;
$i$ = an integer, positive, zero or negative, such that $(p+i)$ represents the number of secondary pole pairs and $(\omega + i\omega_t)$ represents the corresponding secondary angular frequency (the value $i=0$ corresponding to the number of primary pole pairs);
$\Lambda$ = gap permeance per radian, inclusive of series iron reluctance;
$R$ = resistance per phase group;
$k_{0i}$ = effective coupling coefficient between primary winding system and secondary winding system at angular frequency $(\omega + i\omega_t)$;
$t_{0i}$ = effective turns ratio of secondary winding system at angular frequency $(\omega + i\omega_t)$ to primary winding system.

As stated above, the permeance per radian $\Lambda$ between the stator and the rotor, including the air gap and the series iron reluctance varies continuously around the air gap. For one particular embodiment of the invention, the variations of the permeance $\Lambda$, with reference to the point of contact of the rotor and stator, is represented by the curve of Fig. 6. It can be shown mathematically that, with the relatively small eccentricity of the rotor that is practically useful, the permeance per radian during rotation can be expressed with sufficient accuracy by the Fourier series:

$$\Lambda = \tfrac{1}{2}\Lambda_0 + \sum_{m=1}^{\infty} \Lambda_m \cos m(\theta - \omega_t t) \qquad (1)$$

in which the first term is the average value of the function and in which:

$$\Lambda_0 = \frac{2\mu l r}{[(l'_s)^2 + 2l'_s g l_s]^{\tfrac{1}{2}}} \qquad (2)$$

and any succeeding coefficient is:

$$\Lambda_m = \Lambda_0 a^m \qquad (3)$$

where $$a = \frac{l'_s + l_s - [(l'_s)^2 + 2l'_s g l_s]^{\tfrac{1}{2}}}{l_s} \qquad (4)$$

If it is assumed that magnetic flux passes to or from the rotor radially only, no appreciable flux passing to or from the ends, it can also be shown that a system of balanced polyphase primary currents of which the current of the initial phase group is $I_{max} \cos \omega t$ will develop in the permeance given by Equation 1 a magnetic flux per radian across the gap which consists of all components given by the expression:

$$\Phi_{in} = \tfrac{1}{2}\Lambda_i\left(1 - \frac{\Lambda_n + i\Lambda_n}{\Lambda_i \Lambda_0}\right) K_n \frac{Ng I_{max}}{\pi} \cos$$

$$\left[(\omega + i\omega_t)t - (n+i)\theta + \pi n\left(\frac{y-1}{s} + \frac{1}{g}\right)\right] \qquad (5)$$

where $i$ can have any integer value, positive, zero or negative; where $n=p+qg$, $q=$ any integer, positive, zero or negative; and where, for any negative subscript $-m$, $\Lambda_{-m}=\Lambda_m=a^m$.

For a given value of $i$, the flux components evidently revalue at the same angular frequency $(\omega+i\omega_g)$ and so induce in the windings a system of polyphase voltages at this frequency, analogous to the secondary induced voltage of slip frequency in an induction motor. The voltage so induced in the initial phase group is given by the expression:

$$E_i = (\omega+i\omega_s)\Lambda_i\left[\sum_n\left(1-\frac{\Lambda_{n+i}\Lambda_n}{\Lambda_i\Lambda_0}\right)K_{n+i}K_n\right]\frac{N^2gI_{max}}{\pi} \times \cos\left[(\omega+i\omega g)t + \tfrac{1}{2}\pi - \pi i\left(\frac{y-1}{s}+\frac{1}{g}\right)\right] \quad (6)$$

In other phase groups, the induced voltages differ regularly in phase in a manner corresponding to $(p+i)$ pole pairs, a negative value of $(p+i)$ representing negative phase rotation. Thus for each integer value of $i$, there is a distinct angular frequency $(w+i\omega g)$ and a corresponding number of pole pairs $(p+i)$. If suitable closed circuits are provided, these induced voltages will cause corresponding polyphase currents to flow with the same frequency and the same number of pole pairs. Such closed circuits are herein referred to as secondary winding systems corresponding to the integers $i$.

In the special case where $i=0$, the voltage given by Equation 6 reduces to $$E_0 = \omega\Lambda_0\left[\sum_n\left(1-\frac{\Lambda_n^2}{\Lambda_0^2}\right)K_n^2\right]\frac{N^2gI_{max}}{\pi}\cos[\omega t+\pi/2] \quad (7)$$

which is evidently at the primary frequency $\omega$, with the corresponding number of pole pairs $p$. The corresponding system is thus the primary winding system and this voltage corresponds to the primary counter electromotive force of a conventional induction motor.

The form of Equation 7 shows that each phase group has an effective self-inductance, including the effects of all phases, given by the expression:

$$L_0 = \Lambda_0\left[\sum_n\left(1-\frac{\Lambda_n^2}{\Lambda_0^2}\right)K_n^2\right]\frac{N^2g}{\pi}$$
$$(n=p+qg,\ q=\ldots-1,0,1\ldots) \quad (8)$$

In addition, each phase group has components of self-inductance due to local fluxes in the slots and around the end connections; these are calculated by standard methods and should be considered in a refined design.

The form of Equation 6 shows similarly that there is an effective mutual inductance between the primary winding system and each secondary winding system which, referred to one phase group in each, is given by the expression:

$$L_{0i} = \Lambda_i\left[\sum_n\left(1-\frac{\Lambda_{n+i}\Lambda_n}{\Lambda_i\Lambda_0}\right)K_{n+i}K_n\right]\frac{N^2g}{\pi}$$
$$(n=p+qg,\ q=\ldots-1,0,1\ldots) \quad (9)$$

It can be shown further that this mutual inductance is, as usual, a reciprocal property, Equation 9 also serving to determine a component of primary voltage due to a secondary current of angular frequency $(\omega+i\omega g)$. Again, each secondary winding system has a self-inductance $L_i$ for each phase group, expressed by an equation similar to Equation 8:

$$L_i = \Lambda_0\left[\sum_n\left(1-\frac{\Lambda_{n+i}^2}{\Lambda_0^2}\right)K_{n+i}^2\right]\frac{N^2g}{\pi} \quad (10)$$

Finally, each secondary winding system has mutual inductance with every other secondary winding system, expressed by an equation similar to Equation 9; but these mutual inductances are so small that they may reasonably be neglected and are neglected in the remainder of this analysis.

As usual, the mutual inductances given by Equation 9 may be considered in terms of an effective coefficient of coupling $K_{0i}$ defined by the relation:

$$k_{0i}^2 = \frac{L_{0i}^2}{L_0L_i} \quad (11)$$

Also, the effective turns ratio $t_{0i}$ of a secondary winding system to the primary winding system is defined by the relation:

$$t_{0i} = \frac{L_i}{L_{0i}} \quad (12)$$

Equations 8, 9, 10, 11, and 12 show that the relations between the primary and secondary winding systems are the same as those for two coupled circuits. The computations necessary in the design of a motor in accordance with the invention are facilitated by computations in terms of an equivalent electrical circuit. Such a simplified equivalent circuit for a single phase group is represented in Fig. 7 in which the several circuit constants are determined from the foregoing equations. While the circuit of Fig. 7 illustrates a number of secondary winding systems corresponding to the harmonic terms $i=1,2,3$, etc., it will be understood that this is actually a representation of the different parameters of the single motor winding the several harmonic frequencies. Actually, there will effectively be present only such equivalent secondary systems as are effectively short-circuited and as have an appreciable coefficient of coupling with the primary winding.

The theory of the coupling into the primary circuit of the reactance and resistance of a secondary system is essentially the same as in an ordinary polyphase induction motor. Thus an actual secondary reactance $(\omega+i\omega_g)L_i$ is reflected into the primary winding system, not at its own angular frequency $(\omega+i\omega_g)$ but at that of the primary, $\omega$, and is thus multiplied by the factor:

$$\frac{\omega}{\omega+i\omega_s}\cdot\frac{1}{t_{0i}^2} \quad (13)$$

This gives the reflected reactance:

$$\frac{\omega L_i}{t_{0i}^2} = \omega L_0 k_{0i}^2 \quad (14)$$

The secondary resistance R is multiplied by the same factor (13) as is the reactance, giving the reflected resistance:

$$\frac{R}{t_{0i}^2}\cdot\frac{\omega}{\omega+i\omega_s} \quad (15)$$

The power input into this reflected resistance is the power transformed from the primary winding system to the secondary winding system, part of which goes into secondary resistance loss and the remainder of which goes into mechanical power. The part which goes into secondary resistance loss is due to the actual secondary winding resistance, corresponding to $R/t^2_{0i}$ in the primary winding system, so the part which goes into mechanical power corresponds to:

$$\frac{R}{i_{0i}^2}\cdot\frac{\omega}{\omega+i\omega_g}-\frac{R}{i_{0i}^2}=\frac{R}{i_{0i}^2}\cdot\frac{-i\omega_g}{\omega+i\omega_g} \quad (16)$$

This equation indicates that high mechanical output is obtained when $i\omega_g$ is negative and nearly equal to $\omega$. Thus $(\omega+i\omega_g)$ is the angular frequency of slip, which should be small, as in an induction motor. This can evidently occur for only one value of $i$ at a time, this value of $i$ representing the useful secondary winding system, the other secondary winding systems being essentially parasitic.

For the useful value of $i$, the synchronous gyratory angular velocity is $\omega_g=-\omega/i$. So, if $i=1$, the most desirable value, as discussed below, the synchronous angular velocity is $-\omega$. At this angular velocity, the reflected resistance given by Equation (15) and shown in Fig. 7 is infinite and the positive and negative reactances $k^2_{0i}L_0$ then cancel out, as in an induction motor at synchronism.

In selecting a desirable winding arrangement and winding connection for obtaining a motor of high efficiency and high power output at a given gyratory speed, the following are the controlling factors:

(1) The primary winding should have a high self-inductance, which implies that the number of primary pole pairs should be less than that of the secondary pole pairs.

(2) The winding arrangement should provide a high coefficient of coupling between the primary and secondary windings for the value $i$ corresponding to the desired gyratory rotor speed and of a low value for all other values of $i$.

(3) The secondary winding system must provide a short circuit or a path of low impedance for voltages induced therein of $(p+i)$ pole pairs corresponding to the desired value of $i$.

(1) *The primary self-inductance.*—The self-inductance of each primary phase group is given by Equation 8.

There is given in Table I below the values of the factor $$\sum_n (1-\Lambda_n^2/\Lambda_0^2)K_n^2$$

for a secondary winding system of twelve slots, six phase groups, and a value of $b=1.1$ $(b=(l_g+l'_g)/l_g)$ for various values of winding pitch $y$ in slots (full pitch being six slots).

*Table I*

| $p$ | $y=5$ | $y=4$ | $y=3$ | $y=2$ |
|---|---|---|---|---|
| 1 | .523 | .422 | .283 | .141 |
| 2 | .056 | .140 | .168 | .140 |
| 3 | .060 | 0 | .060 | .120 |

(2) *The coefficient of coupling k.*—As stated above, power is transferred from the primary winding system to the secondary winding system to produce currents at an angular frequency of $(\omega+i\omega_g)$ by the coefficient of coupling $k_{0i}$ between the primary winding system and each secondary winding system providing a short circuit for $(p+i)$ pole pairs. This coefficient of coupling is given by Equation 11. The computed values of $k^2_{0i}$ for various values of $i$, $p$, and $y$ are given in Table II.

*Table II*

| $i=1$ | | | | | $i=-1$ | | | | |
|---|---|---|---|---|---|---|---|---|---|
| $p$ | $y=5$ | $y=4$ | $y=3$ | $y=2$ | $p$ | $y=5$ | $y=4$ | $y=3$ | $y=2$ |
| 1 | .211 | .279 | .288 | .279 | 1 | 0 | 0 | 0 | 0 |
| 2 | .023 | 0 | .183 | .295 | 2 | .211 | .279 | .288 | .279 |
| 3 | .023 | 0 | .183 | .295 | 3 | .023 | 0 | .183 | .295 |

| $i=2$ | | | | | $i=-2$ | | | | |
|---|---|---|---|---|---|---|---|---|---|
| 1 | .055 | 0 | .038 | .064 | 1 | .000 | .000 | .000 | .000 |
| 2 | .103 | .049 | 0 | .049 | 2 | 0 | 0 | 0 | 0 |
| 3 | .055 | 0 | .038 | .064 | 3 | .055 | 0 | .030 | .064 |

| $i=3$ | | | | | $i=-3$ | | | | |
|---|---|---|---|---|---|---|---|---|---|
| 1 | .009 | .006 | .000 | .006 | 1 | .000 | .000 | .000 | .004 |
| 2 | .009 | .006 | .000 | .006 | 2 | .000 | .000 | .000 | .000 |
| 3 | 0 | 0 | 0 | 0 | 3 | .000 | .000 | .000 | .004 |

For a practical machine, only one secondary winding system is ordinarily useful, since the slip frequency $(\omega+i\omega_g)$ can be made small only for one value of $i$ in any given design. Therefore, some particular value of $i$ must be chosen for this useful secondary winding system. Table II, above, shows that the value $i=1$ for $p=1$ gives the greatest coefficient of coupling and, therefore, the highest power output and efficiency. For $p=1$ and $i=1$ the table indicates most desirable choices of the parameter $y$ as 4 and 3.

Table II also shows that the same value of $k^2_{0i}$ is obtained for $p=1$, $p+i=2$ as for $p=2$, $p+i=1$; and that the same value is also obtained for $p=2$, $p+i=3$ $(i=1)$ as for $p=3$, $p+i=2$ $(i=-1)$, but, as seen in Table I the lowest value of pole pairs $p$ gives the highest value of primary self-inductance which, as stated above, is one of the important factors contributing to maximum power output and efficiency of the motor.

(3) *Secondary short circuits.*—As stated above, the desired value of $i$ determines the synchronous speed of the rotor. Thus, when $i=1$, the rotor has a synchronous speed of one revolution per cycle. In order to develop power at this frequency, the secondary winding system must provide a short circuit for induced voltages of $p+1$ pole pairs. As stated above, if the primary and secondary winding systems are independent, there is a very large number of arrangements of windings which will meet these conditions. However, when the primary and secondary windings are merged, there are only a limited number of winding arrangements which satisfy these conditions. In the case of a three-phase, two-pole, primary winding, it appears that only the winding arrangements of Figs. 8a, 8b, and 8c, with reversals in the winding groups of each phase are useful. For each of these winding arrangements, there is a preferred winding pitch for the coils resulting in minimum values of the parameter $k^2_{0i}$ for all undesired values of $i$. For a winding arrangement of twelve slots, six phase groups, $p=1$, $i=1$, and $b=1.1$, the values of the parameter $k^2_{0i}$ are given in the following Table III:

*Table III*

| $y$ | $k^2_{01}$ | $k^2_{02}$ | $k^2_{03}$ |
|---|---|---|---|
| 5 | .211 | .055 | .009 |
| 4 | .279 | 0 | .006 |
| 3 | .288 | .038 | .000 |

However, it must be remembered that a finite value of $k^2_{01}$ does not means that useful torque will be developed at that value of $i$, unless the secondary winding provides a short circuit for induced voltages of $(p+i)$ pole pairs. Thus from Table III, if $y=5$, the torque developed for $i=2$ at one-half synchronous speed, due to the factor $k^2_{02}=0.055$ will only be developed for a secondary short circuit for $(p+i)=3$ pole pairs. Thus, any secondary winding system providing such a short circuit would develop a serous discontinuity in the torque curve at one-half synchronous speed. Similarly, $y=3$ is not too desirable. $y=4$ is probably the most desirable parameter as then $k^2_{02}=0$ and $k^2_{03}=0.006$, which is small enough to be neglected. The term $k^2_{03}$ cannot, however, be completely eliminated by any choice of winding arrangements and connections, since connections giving short circuits for $(p+i)=2$ also give short circuits for $(p+i)=4$.

There follow the essential parameters of one physical embodiment of the dynamoelectric machine illustrated in Figs. 1 and 2 of the drawings, having a winding arrangement illustrated in Fig. 8c, computed in accordance with the above principles:

| | |
|---|---|
| $r$=radius of stator bore _____inches__ | 1.84 |
| Radius of rotor _____do____ | 1.775 |
| $l_g$=one-half the maximum air gap_do____ | 0.065 |
| Axial length of stack _____do____ | 1.50 |
| Outside diameter of stator yoke __do____ | 10.75 |
| Inside diameter of stator yoke____do____ | 7.50 |
| Stator slots _____ | 12 |
| Primary poles _____ | 2 |
| Total number of phase groups (phase groups per pair of poles) _____ | 6 |
| Coils per phase group _____ | 2 |
| Coil pitch _____slots__ | 4 |

Each coil 75 turns No. 15 double vinyl resin coated wire; coils in each phase group in series coil connection for 125 volts, 3 phase, 60 C. P. S. connected as shown in Fig. 8c.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An induction motor comprising: a stationary field member having a cylindrical rotor tunnel; a cylindrical magnetic armature member disposed within said tunnel and proportioned to provide an asymmetrical reluctance relative to the axis of said field member; said field member including a symmetrical distributed polyphase winding system including a plurality of phase windings connected to provide a path of low impedance to induced currents of a predetermined slip frequency and normal impedance to currents of supply frequency for producing between said members relative movement having a rotational component.

2. An induction motor comprising: a stationary field member comprising a stack of spider laminations forming external radial winding slots and a continuous cylindrical rotor tunnel and a magnetic yoke surrounding said stack; a cylindrical magnetic armature member disposed within said tunnel and proportioned to provide an asymmetrical reluctance relative to the axis of said field member; said field member including a symmetrical distributed polyphase winding system disposed in said slots and including a plurality of phase windings connected to provide a path of low impedance to induced currents of a predetermined slip frequency and normal impedance to currents of supply frequency for producing between said members relative movement having a rational component.

3. An induction motor comprising: relatively movable field and magnetic armature members; one of said members defining a chamber and the other being of convex configuration and of lesser cross-sectional area than said chamber and disposed for relative gyratory motion with respect to and within said chamber; said field member including a symmetrical distributed polyphase winding means including a plurality of phase windings connected to provide a path of low impedance to induced currents of a predetermined slip frequency and normal impedance to currents of supply frequency for producing such relative gyratory motion.

4. An induction motor comprising: a stationary field member havng a cylindrical rotor tunnel; a cylindrical magnetic armature member disposed within said tunnel and proportioned to provide an asymmetrical reluctance relative to the axis of said field member; a pair of end caps engaging opposite faces of said field member for retaining said armature member within said tunnel; said field member including a symmetrical distributed polyphase winding system including a plurality of phase windings connected to provide a path of low impedance to induced currents of a predetermined slip frequency and normal impedance to currents of supply frequency for producing between said members relative movement having a rotational component.

5. An induction motor comprising: a stationary field member having a cylindrical rotor tunnel; a cylindrical magnetic armature member disposed within said tunnel and proportioned to provide an asymmetrical reluctance relative to the axis of said field member; said armature member having a cylindrical bore; a pair of end caps engaging opposite faces of said field member; and a through bolt extending between said end caps and through said armature member for retaining said armature member within said tunnel while permitting full-floating movement thereof; said field member including a symmetrical distributed polyphase winding system for producing between said members relative movement having a rotational component.

6. An induction motor comprising: relatively movable field and magnetic armature members; said members being one within the other and having relative configurations providing an asymmetrical reluctance relative to the axis of said field member; said field member including a symmetrical distributed polyphase winding system including a plurality of phase windings connected to provide a path of low impedance to induced currents of a predetermined slip frequency and normal impedance to currents of supply frequency for producing between said members relative movement having a rotational component.

7. An induction motor comprising: relatively movable field and magnetic armature members; said members being one within the other and having relative configurations providing an asymmetrical reluctance relative to the axis of said field member; said field member including a symmetrical distributed polyphase exciting winding comprising a plurality of phase windings connected to provide a path of low impedance to induced currents of a predetermined slip frequency and normal impedance to currents of supply frequency for producing between said members relative movement having a rotational component.

8. An induction motor comprising: relatively movable field and magnetic armature members; said members being one within the other and having relative configurations providing an asymmetrical reluctance relative to the axis of said field member; said field member including a symmetrical distributed polyphase exciting winding and a secondary winding system including a plurality of phase windings connected to provide a path of low impedance to induced currents of a predetermined slip frequency for producing between said members relative movement having a rotational component.

9. An induction motor comprising: relatively movable field and magnetic armature members; said members being one within the other and having relative configurations providing an asymmetrical reluctance relative to the axis of said field member; said field member including a symmetrical three-phase winding for producing between said members relative movement having a rotational component; said winding system comprising two windings per phase connected in parallel, the windings of the several phases being Y-connected for external connection.

10. An induction motor comprising: relatively movable field and magnetic armature members; said members being one within the other and having relative configurations providing an asymmetrical reluctance relative to the axis of said field member; said field member including a symmetrical three-phase winding for producing between said members relative movement having a rotational component; said winding system comprising two windings per phase connected in parallel, the windings of the several phases being connected in delta for external connection.

HERBERT C. ROTERS.

REFERENCES CITED

The following references are of record in the file of this patent:

UNITED STATES PATENTS

| Number | Name | Date |
|---|---|---|
| 586,823 | Patten | July 20, 1897 |
| 1,350,077 | Loudon | Aug. 17, 1920 |
| 1,862,356 | Warren | June 7, 1932 |
| 2,185,990 | Schurch | June 2, 1940 |
| 2,378,668 | Vickers | May 24, 1943 |
| 2,437,904 | Adams et al. | Mar. 16, 1948 |

FOREIGN PATENTS

| Number | Country | Date |
|---|---|---|
| 365,363 | Italy | Dec. 2, 1938 |

OTHER REFERENCES

"Thompson's Dynamo Electric Machinery," vol. II, publ. by Spon & Chamberlin, London, 1904, page 660.